US012753697B2

(12) United States Patent
Lutjen et al.

(10) Patent No.: US 12,753,697 B2
(45) Date of Patent: Oct. 6, 2026

(54) COOLING FEATURES FOR A COMPONENT OF A GAS TURBINE ENGINE

(71) Applicant: RTX Corporation, Farmington, CT (US)

(72) Inventors: Paul M. Lutjen, Kennebunkport, ME (US); James R. Plante, East Waterboro, ME (US); Billie R. Maldonado, Seattle, WA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/677,538

(22) Filed: May 29, 2024

(65) Prior Publication Data

US 2025/0369359 A1 Dec. 4, 2025

(51) Int. Cl.
*F01D 5/18* (2006.01)
*F01D 11/00* (2006.01)

(52) U.S. Cl.
CPC ............ *F01D 5/187* (2013.01); *F01D 11/005* (2013.01); *F05D 2250/294* (2013.01)

(58) Field of Classification Search
CPC ...... F01D 5/187; F01D 5/186; F05D 2260/20; F05D 2260/202; F05D 2260/204; F05D 2260/221; F05D 2260/2212; F05D 2260/22141
See application file for complete search history.

(56) References Cited

U.S. PATENT DOCUMENTS

| | | | | |
|---|---|---|---|---|
| 7,854,591 | B2 * | 12/2010 | Liang | F01D 5/187 415/115 |
| 8,128,366 | B2 | 3/2012 | Strock et al. | |
| 10,605,093 | B2 | 3/2020 | Hoskin et al. | |
| 10,670,268 | B2 | 6/2020 | Cunha et al. | |
| 10,689,986 | B1 * | 6/2020 | Ameri | F01D 5/186 |
| 10,731,562 | B2 | 8/2020 | Porter et al. | |
| 11,359,494 | B2 * | 6/2022 | Osgood | F01D 5/187 |
| 11,566,536 | B1 * | 1/2023 | Cox | F01D 5/187 |

(Continued)

FOREIGN PATENT DOCUMENTS

| | | | | |
|---|---|---|---|---|
| CN | 112855285 A * | 5/2021 | | F01D 25/12 |
| DE | 102019108004 A1 * | 12/2019 | | F01D 9/02 |

(Continued)

OTHER PUBLICATIONS

Extended European Search Report for EP Application No. 25179435.0; Issue date, Aug. 29, 2025, 18 pages.

*Primary Examiner* — Ryan C Clark
(74) *Attorney, Agent, or Firm* — CANTOR COLBURN LLP

(57) ABSTRACT

A component for a gas turbine engine, including: at least one internal cavity extending through the component, the internal cavity having at least one inlet opening and at least one outlet opening each being in fluid communication with the at least one internal cavity; and a plurality of cooling features extending from a surface of the at least one internal cavity, the plurality of cooling features extend away from the surface of the at least one internal cavity, each of the plurality of cooling features having a curved exterior surface and a passage extending from the curved exterior surface to an exterior surface of the component.

17 Claims, 8 Drawing Sheets

(56) References Cited

U.S. PATENT DOCUMENTS

| | | | | |
|---|---|---|---|---|
| 2002/0062945 | A1* | 5/2002 | Hocker | F01D 5/189 165/53 |
| 2002/0172596 | A1 | 11/2002 | Kohli et al. | |
| 2009/0304494 | A1 | 12/2009 | Strock et al. | |
| 2012/0207591 | A1* | 8/2012 | Lee | F01D 5/187 415/191 |
| 2013/0205790 | A1* | 8/2013 | Xu | F01D 5/186 415/116 |
| 2016/0109130 | A1 | 4/2016 | Stastny et al. | |
| 2017/0306764 | A1* | 10/2017 | Konitzer | F01D 25/002 |
| 2019/0169998 | A1* | 6/2019 | Whitfield | F01D 5/187 |
| 2019/0186272 | A1 | 6/2019 | Webster et al. | |
| 2019/0218940 | A1* | 7/2019 | Propheter-Hinckley | F01D 5/186 |
| 2019/0316472 | A1* | 10/2019 | Xu | F01D 9/041 |
| 2020/0141271 | A1 | 5/2020 | Waite et al. | |
| 2021/0222565 | A1 | 7/2021 | Snider et al. | |
| 2021/0222566 | A1* | 7/2021 | Snider | F01D 5/186 |
| 2023/0417144 | A1* | 12/2023 | Nam | F01D 5/186 |
| 2024/0125272 | A1 | 4/2024 | Maldonado et al. | |

FOREIGN PATENT DOCUMENTS

| | | | | |
|---|---|---|---|---|
| EP | 3461996 | A1 * | 4/2019 | F01D 5/186 |
| EP | 3660269 | A1 * | 6/2020 | F01D 5/18 |
| EP | 3988763 | A1 * | 4/2022 | F01D 5/187 |
| FR | 3107919 | A1 * | 9/2021 | F01D 5/187 |
| FR | 3111661 | A1 | 12/2021 | |
| JP | 2009041433 | A * | 2/2009 | F01D 5/187 |
| WO | WO-2015116292 | A2 * | 8/2015 | F01D 5/288 |

* cited by examiner

COOLING FEATURES FOR A COMPONENT OF A GAS TURBINE ENGINE

BACKGROUND

This disclosure relates to cooling features for a component of gas turbine engine and more particularly, a component of a gas turbine engine with the aforementioned cooling features.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Blade outer air seals (BOAS), vanes, blades and other components are located in hot sections of the gas turbine engine. In some instances these components are cooled with cooling air that passes through an interior cavity of the component. Accordingly, it is desirable to provide a cooled hot section component with features that improves the cooling efficiency.

BRIEF DESCRIPTION

Disclosed is a component for a gas turbine engine, including: at least one internal cavity extending through the component, the internal cavity having at least one inlet opening and at least one outlet opening each being in fluid communication with the at least one internal cavity; and a plurality of cooling features extending from a surface of the at least one internal cavity, the plurality of cooling features extend away from the surface of the at least one internal cavity, each of the plurality of cooling features having a curved exterior surface and a passage extending from the curved exterior surface to an exterior surface of the component.

In addition to one or more of the features described above, or as an alternative to any of the foregoing embodiments, the passage follows a curvature of the curved exterior surface.

In addition to one or more of the features described above, or as an alternative to any of the foregoing embodiments, the passage has a lobed internal surface.

In addition to one or more of the features described above, or as an alternative to any of the foregoing embodiments, the lobed internal surface of the passage rotates either clockwise or counter with respect to a center axis of the passage.

In addition to one or more of the features described above, or as an alternative to any of the foregoing embodiments, the passage has a rifled internal surface with a plurality of lands and grooves.

In addition to one or more of the features described above, or as an alternative to any of the foregoing embodiments, the rifled internal surface of the passage rotates either clockwise or counter with respect to a center axis of the passage.

In addition to one or more of the features described above, or as an alternative to any of the foregoing embodiments, each of the plurality of cooling features has a symmetrical configuration.

In addition to one or more of the features described above, or as an alternative to any of the foregoing embodiments, each of the plurality of cooling features has an asymmetrical configuration.

In addition to one or more of the features described above, or as an alternative to any of the foregoing embodiments, the plurality of cooling features has symmetrical configurations and asymmetrical configurations.

In addition to one or more of the features described above, or as an alternative to any of the foregoing embodiments, the component is one of a blade outer air seal, a turbine blade, and vane.

In addition to one or more of the features described above, or as an alternative to any of the foregoing embodiments, the component is a blade outer air seal.

In addition to one or more of the features described above, or as an alternative to any of the foregoing embodiments, additional cooling features extend from an exterior surface of the component, each of the additional cooling features having a passage extending from the at least one internal cavity to an exterior surface of the additional cooling features.

In addition to one or more of the features described above, or as an alternative to any of the foregoing embodiments, each of the plurality of plurality of cooling features have a main body portion that extends from the surface of the at least one internal cavity and the main body portion has a larger base portion as compared to a top portion of the main body portion.

In addition to one or more of the features described above, or as an alternative to any of the foregoing embodiments, the top portion extends horizontally with respect the surface of the at least one internal cavity, such that the top portion is angularly oriented with respect to the base portion.

In addition to one or more of the features described above, or as an alternative to any of the foregoing embodiments, the passage has an inlet opening located in the top portion.

Also disclosed is a gas turbine engine, including; at least one component configured to receive a cooling air flow; at least one internal cavity extending through the component, the internal cavity having at least one inlet opening and at least one outlet opening each being in fluid communication with the at least one internal cavity; and a plurality of cooling features extending from a surface of the at least one internal cavity, the plurality of cooling features extend away from the surface of the at least one internal cavity, each of the plurality of cooling features having a curved exterior surface and a passage extending from the curved exterior surface to an exterior surface of the component.

In addition to one or more of the features described above, or as an alternative to any of the foregoing embodiments, the passage follows a curvature of the curved exterior surface.

In addition to one or more of the features described above, or as an alternative to any of the foregoing embodiments, the passage has a lobed internal surface.

In addition to one or more of the features described above, or as an alternative to any of the foregoing embodiments, the lobed internal surface of the passage rotates either clockwise or counter with respect to a center axis of the passage.

In addition to one or more of the features described above, or as an alternative to any of the foregoing embodiments, the component is one of a blade outer air seal, a turbine blade, and vane.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
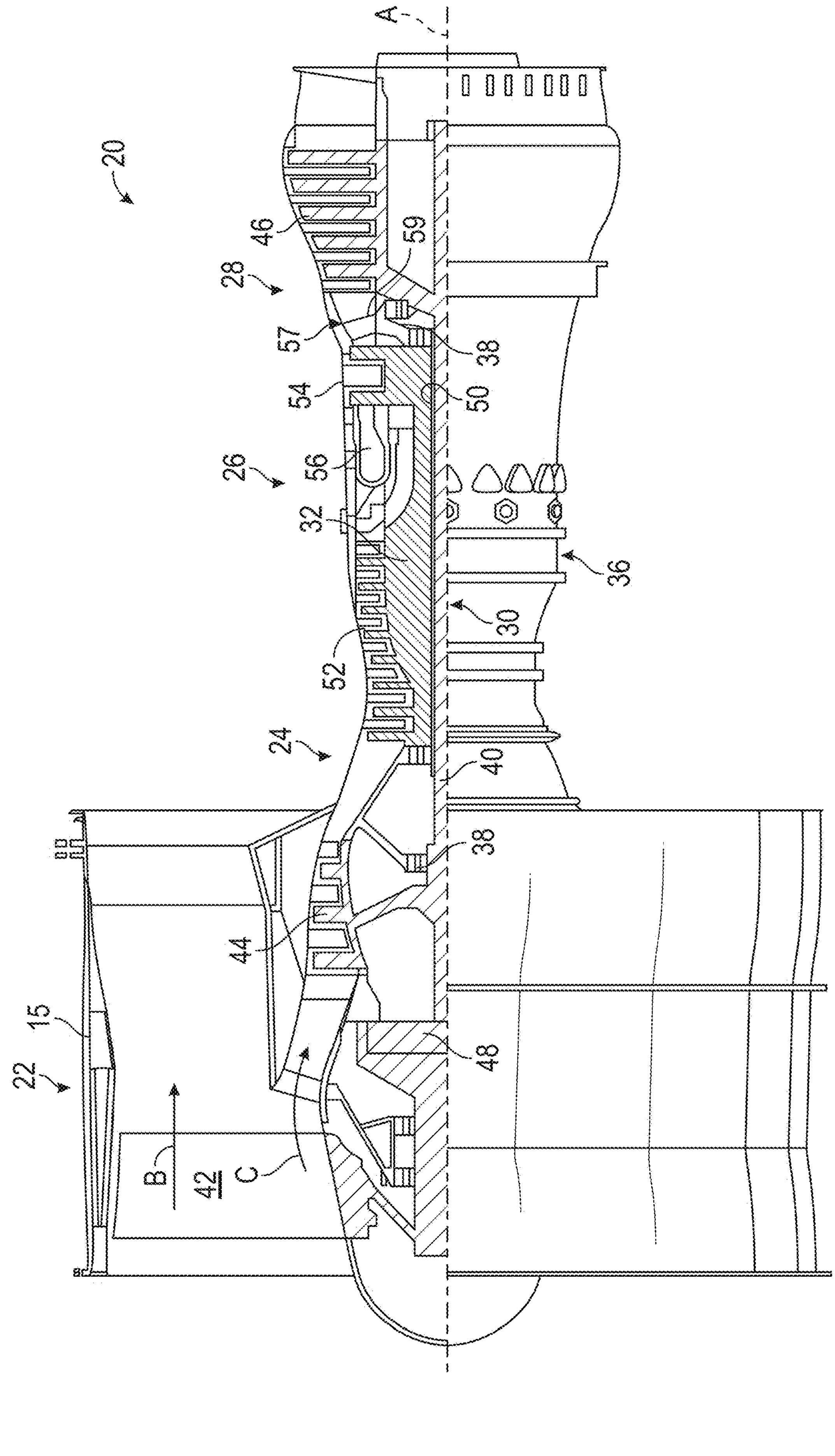
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C1 for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In one embodiment, the geared architecture 48 is an epicyclic gear train, such as a planetary gear system or other gear system. It should be understood, however, that the above parameters are only exemplary of one embodiment of a geared architecture engine and that the present disclosure is applicable to other gas turbine engines including but not limited a non-geared architecture engine or direct drive turbofans.

Figure 2:
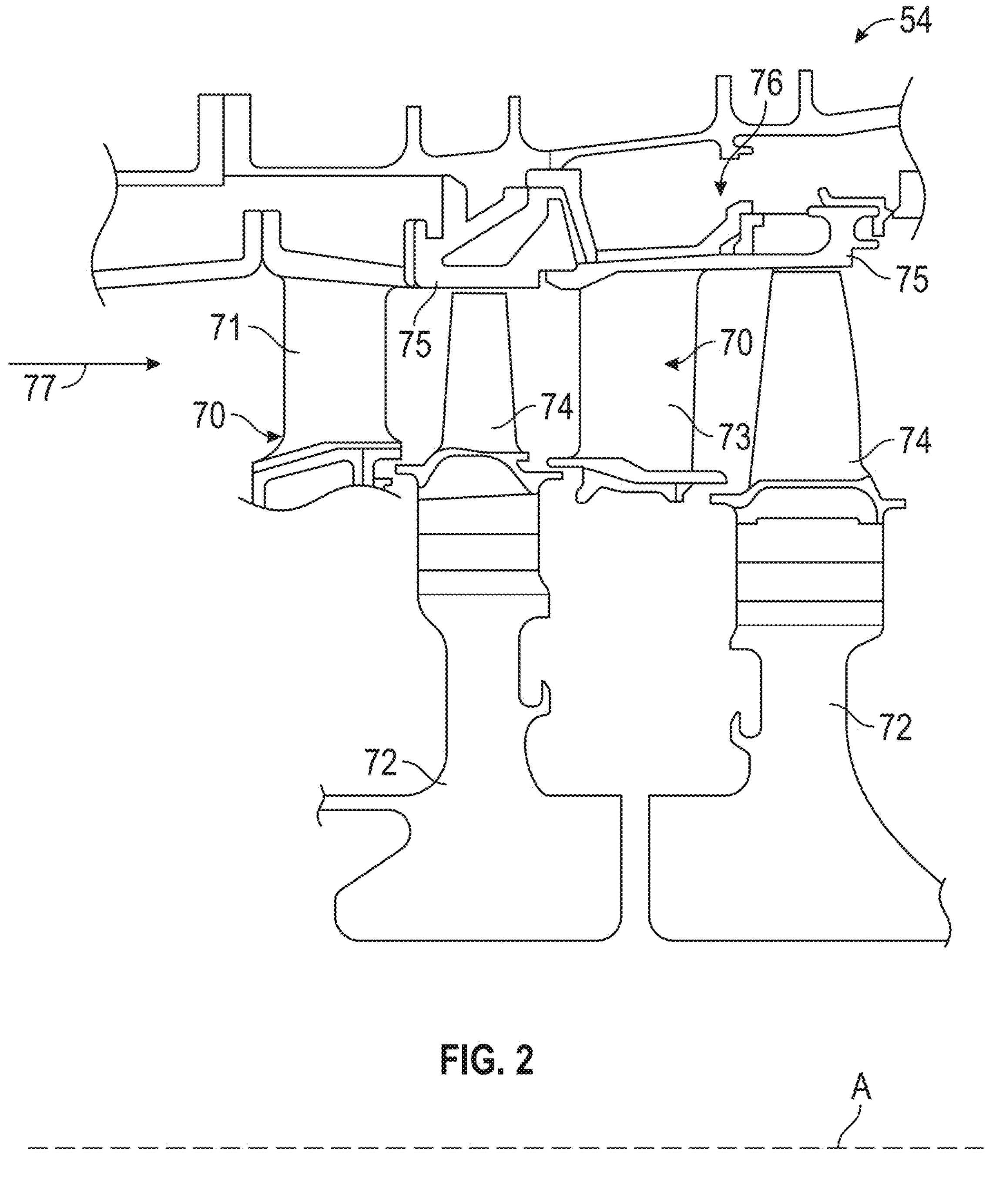
FIG. 2 is a schematic view of a two-stage high pressure turbine of the gas turbine engine.

FIG. 2 illustrates a portion of the high pressure turbine (HPT) 54. FIG. 2 also illustrates a high pressure turbine stage vanes 70 one of which (e.g., a first stage vane 71) is located forward of a first one of a pair of turbine disks 72 each having a plurality of turbine blades 74 secured thereto. The turbine blades 74 rotate proximate to blade outer air seals (BOAS) 75 which are located aft of the first stage vane 71. The other vane 70 is located between the pair of turbine disks 72. This vane 70 may be referred to as the second stage vane 73. As used herein the first stage vane 71 is the first vane of the high pressure turbine section 54 that is located aft of the combustor section 26 and the second stage vane 73 is located aft of the first stage vane 71 and is located between the pair of turbine disks 72. In addition, blade outer air seals (BOAS) 75 are disposed between the first stage vane 71 and the second stage vane 73. The high pressure turbine stage vanes 70 (e.g., first stage vane 71 or second stage vane 73) are one of a plurality of vanes 70 that are positioned circumferentially about the axis A of the engine in order to provide a stator assembly 76. Hot gases from the combustor section 26 flow through the turbine in the direction of arrow 77. Although a two-stage high pressure turbine is illustrated other high pressure turbines are considered to be within the scope of various embodiments of the present disclosure.

The high pressure turbine (HPT) is subjected to gas temperatures well above the yield capability of its material. In order to mitigate such high temperature detrimental effects, a supply of cooling air is applied to an internal cavity of components located in the hot sections of the gas turbine engine. This cooling air may also be used for surface film-cooling by supplying the cooling air through cooling holes drilled on the components.

It should be noted that the terms “radial”, “axial” and “circumferential” used throughout the description and the appended claims, are defined with respect to the central axis A of the engine 20. The terms “front”, “forward” “afore”, “aft” and after” used throughout the description and the appended claims are defined with respect to the flow direction of air being propelled through the engine 20.

As used herein forward or upstream and rearward or downstream refer are relative to the engine central longitudinal axis A and the direction gases flowing through the gas turbine engine 20. In addition, radially inward and radially outward also refer to the engine central longitudinal axis A.

As used herein, “integral” or “integrally formed” is intended to cover a single unitary structure. In other words, the single unitary structure is not capable of being disassembled without cutting or destruction of the single unitary structure.

Figure 3:
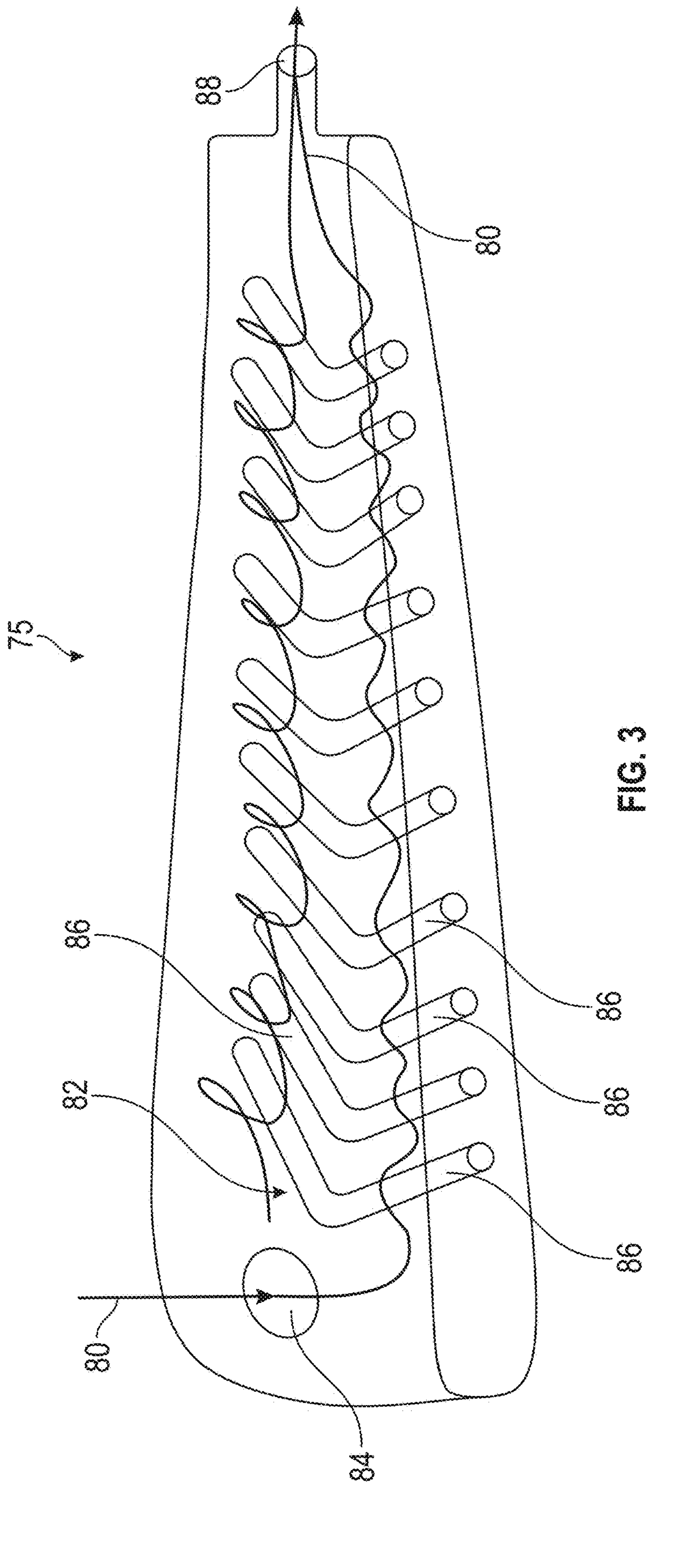
FIG. 3 is a schematic view of a blade outer air seal for use in a gas turbine engine.

FIG. 3 schematically illustrates a blade outer air seal (BOAS) 75. Cooling air flow is illustrated by arrows 80 that is introduced into a cavity or channel 82 of the blade outer air seal 75 via at least one inlet opening 84. The cooling air flow is directed through the channels 82 that extend internally in the blade outer air seal 75. The channels 82 are provided with trip strips 86. These trip strips 86 can be generally referred to as protrusions or cooling features that extend from a surface of the channel. The trip strips create turbulences in the cooling air flow which enhances convection. The channel 82 is in fluid communication with the at least one inlet opening 84 and at least one outlet opening 88. The cooling air exiting the at least one outlet opening 88 may be used for surface film cooling. The at least one outlet opening 88 may be located away from the at least one inlet opening 84 such that maximum cooling efficiently can be achieved internally before the cooling air exits the channel 82 via the at least one outlet opening 88. However, prior manufacturing techniques have limited the size and detail in which the trip strips 86 can be produced.

In accordance with the present disclosure and by using tomographic layering technology, internal features of the components have be refined to manipulate the cooling airflow and improve heat transfer by using internal cooling features or protrusions 90 in lieu of trip strips 86 and/or in combination with trip strips 86. For example, a three dimensional 3D digital model is transformed into a series of lithographic masks. Each mask representing a cross-sectional slice of a desired 3D solid. Each mask is then used to photochemically machine a replica from metal foil or polymeric film. Then the foil or films are stack-laminated to create a master mold. Then, production molds are then derived from the master mold. Then, the desired material is cast into or around the production mold to product the part.

In other words, lithographic etching and assembly are combined with computerized numerical control (CNC) machining to produce tools and/or cores with highly complex three-dimensional features. Afterwards a molding and casting process is then used with the cores to produce parts. See also U.S. Pat. No. 8,598,553.

Figure 4:
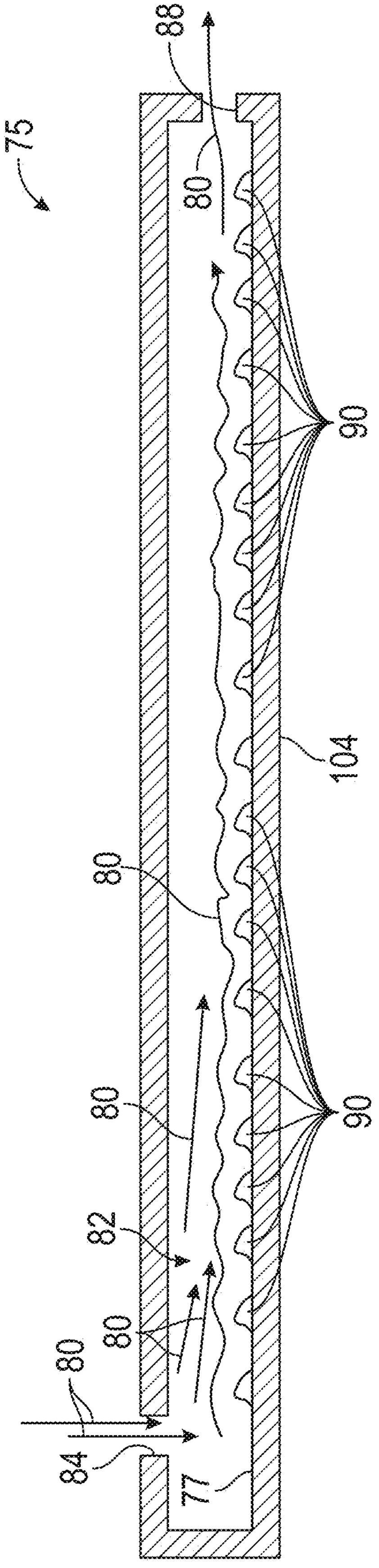
FIG. 4 is a schematic view of a blade outer air seal or component for use in a gas turbine engine.

For example, FIG. 4 schematically illustrates a cavity or channel 82 of a blade outer air seal (BOAS) or other component 75 which may be formed using the aforementioned processes. Cooling air flow is illustrated by arrows 80 that is introduced into the cavity or channel 82 of the blade outer air seal or other component 75 via at least one inlet opening 84. The cooling air flow is directed through the channels 82 that extend internally in the blade outer air seal or other component 75. The channels 82 are provided with protrusions or cooling features 90 that extend from a surface 77 of the channel 82. It is understood, that the protrusions or cooling features 90 can be located on other surfaces of the channel 82 other than the illustrated surface 77. As such, the surface may be an upper surface, lower surface or both and/or side surfaces or any combination thereof.

These protrusions or cooling features 90 create turbulences in the cooling air flow which enhances convection. The channel 82 is in fluid communication with the at least one inlet opening 84 and at least one outlet opening 88. The cooling air exiting the at least one outlet opening 88 may be used for surface film cooling. The at least one outlet opening 88 may be located away from the at least one inlet opening 84 such that maximum cooling efficiently can be achieved internally before the cooling air exits the channel 82 via the at least one outlet opening 88.

For example and referring now to at least FIGS. 4-8, cooling features 90 in accordance with various embodiments of the present disclosure are illustrated. As illustrated in at least FIG. 4, a portion of an interior cavity or channel 82 of a component or blade outer air seal (BOAS) 75 of the gas turbine engine 20 is illustrated. The component 75 may be any component that requires cooling including but not limited to any one of the following: blade outer air seals (BOAS), vanes, blades and other components that are required to be cooled by a source of cooling air. Moreover, the component 75 may have a plurality of interior cavities or channels 82 and the specific configurations of the component or blade outer air seal (BOAS) and the location of the cooling features 90 is not intended to be limited by the specific configurations illustrated in the attached FIGS. For example, the component 75 may have a plurality of interior cavities or channels 82 each with inlet and outlet openings 84, 88 and the plurality of interior cavities or channels 82 may be fluidly isolated from each other and/or in fluid communication with each other.

In addition, the channels or cavities 82 and the cooling air flow may extend circumferentially across the blade outer air seal or other component 75 from a blade arrival edge to a blade departure edge. Alternatively, the channels or cavities 82 and the cooling air flow extend axially across the blade outer air seal or other component 75 from a leading edge to a trailing edge. In yet another alternative, the channels or cavities 82 and the cooling air flow may be arranged to have a combination of channels or cavities 82 that extend circumferentially across the blade outer air seal or other component 75 from the blade arrival edge to the blade departure edge as well as axially across the blade outer air seal or other component 75 from the leading edge to the trailing edge.

Figure 5:
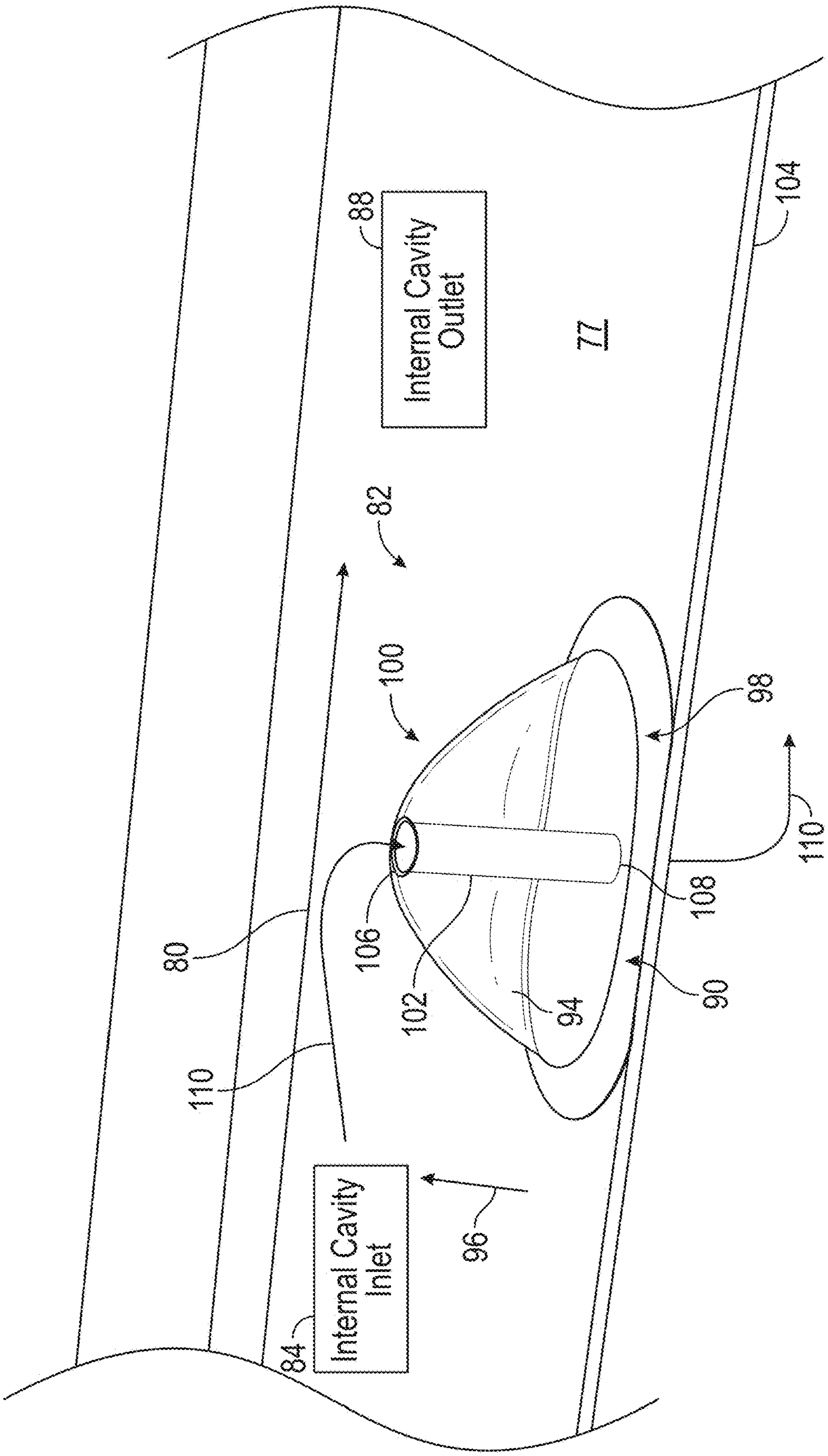
FIGS. 5-8 illustrate cooling features in accordance with various embodiments of the present disclosure.

Referring now to at least FIG. 5, the cooling feature 90 (illustrated in phantom) may comprise a rounded or curved protrusion that extends away from the surface 77 of the cooling channel 82. As such, the cooling feature 90 has a curved exterior surface. Although, FIG. 5 illustrates a single cooling feature 90 it is, of course, understood that a plurality of cooling features 90 are located within the cooling channel 82. Each cooling feature 90 includes a main body portion 94 that extends upwardly in the direction of arrow 96 away from the surface 77. In one non-limiting embodiment, the main body portion 94 may have a larger base portion 98 as compared to a top portion 100 of the main body portion 94. In the illustrated embodiment of FIG. 5, the cooling feature 90 is shaped as a rounded protrusion or pedestal, which in one embodiment may be symmetrical. Alternatively, the cooling feature 90 is asymmetrical.

Located in the cooling feature 90 is a passage 102 that extends from an exterior surface of the cooling feature 90 though the main body portion 94 to an exterior surface 104 of the component or blade outer air seal (BOAS) 75 in order to provide surface film cooling to the exterior surface 104. In one embodiment, the exterior surface 104 of the component 75 may be a gas path surface or component 75 is a hot section component of the engine 20 that requires surface film cooling. Passage 102 will have an inlet opening 106 located on the exterior surface of the cooling feature 90 and an outlet opening 108 located on the exterior surface 104. As such, and as illustrated by arrows 110, the cooling air 80 may enter the cooling feature 90 and exit on the exterior surface 104.

In one non-limiting embodiment, the inlet opening 106 is located on a top portion of the cooling feature 90. Of course, other locations are contemplated to be within the scope of the present disclosure.

Figure 6:
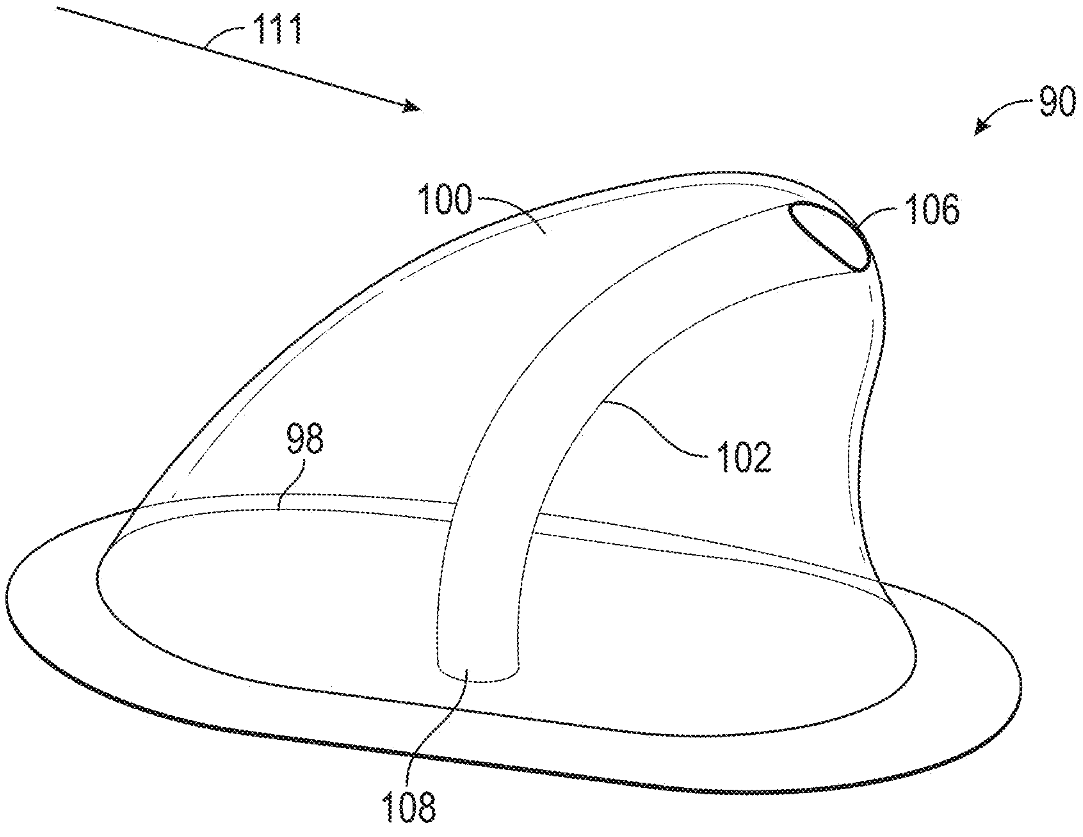

Referring now to FIG. 6, the main body portion 94 or top portion 100 (illustrated in phantom) extends horizontally (in the direction of arrow 111) with respect to surface 77, such that the top portion 100 is angularly oriented in the direction of arrow 111 with respect to the base portion 98. In this configuration, the inlet opening 106 is arranged downstream with respect to the cooling air flow in the direction of arrows 80. In one non-limiting embodiment, the passage 102 is curved to match the curvature of the cooling feature 90. Alternatively, the cooling feature 90 illustrated in FIG. 6 may be oriented 180 degrees with respect to the configuration illustrated in FIG. 6 such that the inlet opening 106 is arranged upstream or facing the cooling air flow in the direction of arrows 80. Again and in one non-limiting embodiment, the passage 102 is curved to match the curvature of the cooling feature 90.

Figures 7, 7A:
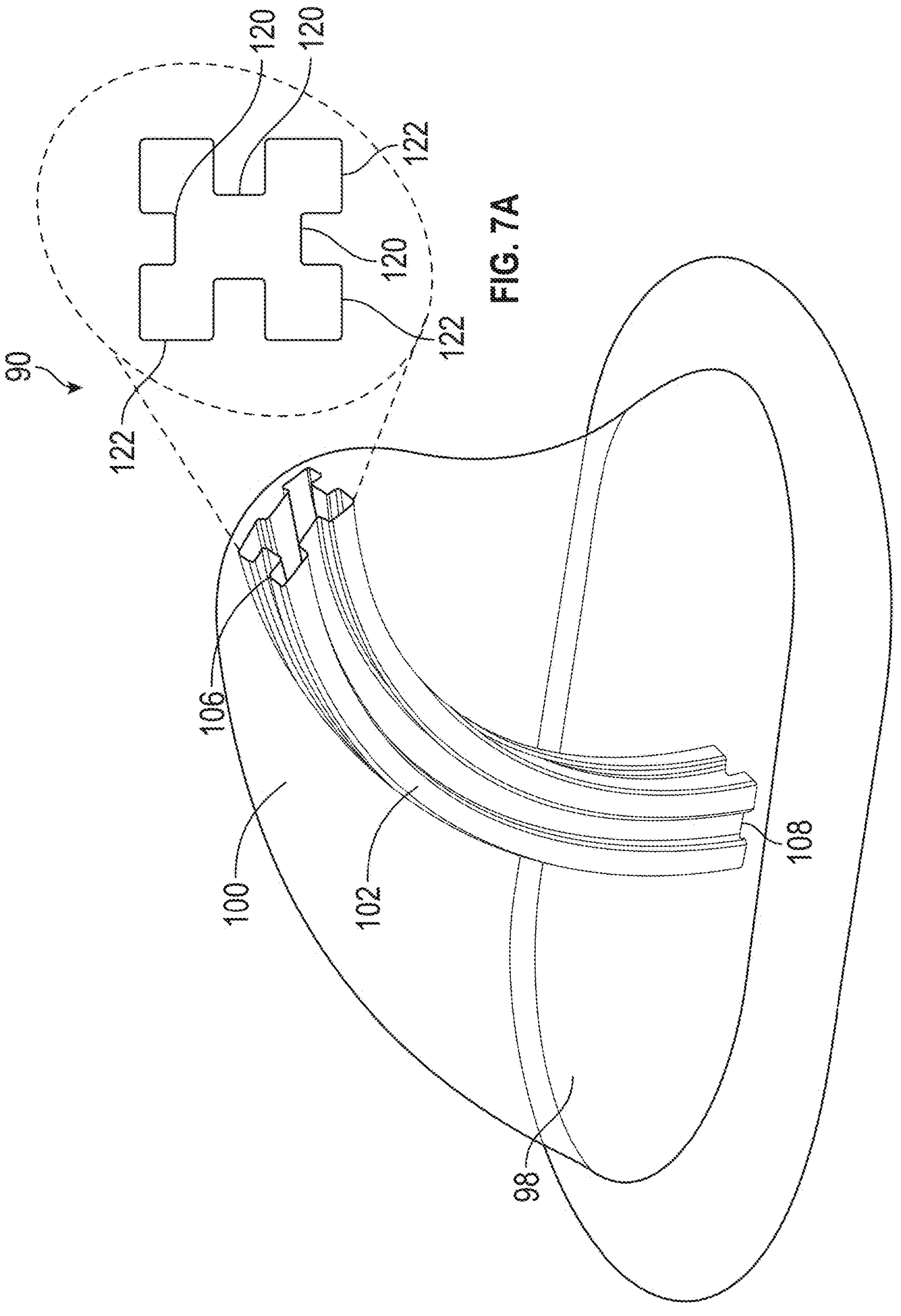

Referring now to at least FIGS. 7 and 7A, the passage 102 of the cooling feature 90 (illustrated in phantom) is configured to have a rifled interior surface having a plurality of lands 120 and grooves 122 in order to provide turbulence to the cooling air in order to enhance the cooling effect of the cooling features 90 as the cooling air flow as passes through passage 102 by creating turbulent air flow through passage 102. In other words, the passage 102 in this embodiment has a lobed interior surface. Although, the rifled or lobed passage is only shown in the configuration of FIG. 7 it is also contemplated that a rifled or lobed passage 102 can be applied to at least the configuration of the cooling feature 90 illustrated in at least FIG. 6.

Figure 8:
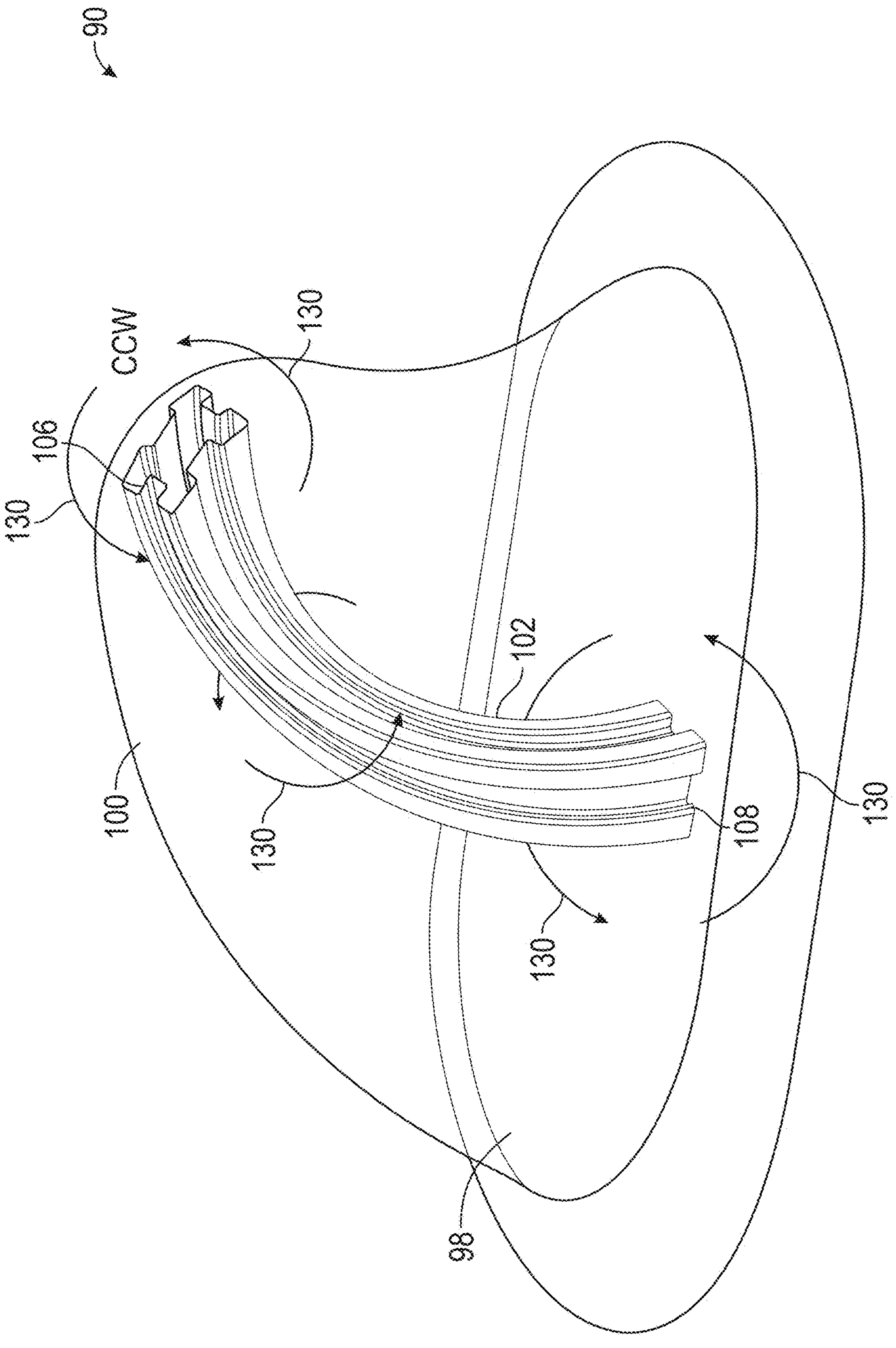

Referring now to at least FIG. 8, the passage 102 of the cooling feature 90 (illustrated in phantom) with the rifled or lobed interior is configured to be twisted or rotates in the directions of arrows 130 in order to provide a rotational configuration with respect to a center axis of the passage 102 as it passes through the cooling feature 90. As such, a rotational vortex is applied to the cooling air as it passes through passage 102. In one embodiment, the arrows 130 provide a counter clockwise rotation to passage 102. Alternatively, the arrows 130 provide a clockwise rotation to passage 102 or in yet another configuration the rotation may vary between clockwise and counter clockwise directions. Although, the rifled passage is only shown in the configuration of FIG. 7 it is also contemplated that the rifled passage 102 can be applied to at least the configuration of the cooling feature 90 illustrated in at least FIG. 6.

Again, air turbulence and enhanced cooling is provided by the plurality of features 90, either by passage 102 as well as the exterior configuration of the cooling features 90. While different configurations of the cooling features 90 are illustrated in the attached FIGS. it is understood that the cooling passages or cavities 82 of the component 75 may have any combination of the aforementioned features 90 or may be limited to one specific set of features 90 illustrated and described herein.

As previously mentioned, the component 75 may be any component that requires cooling including but not limited to any one of the following: blade outer air seals (BOAS), vanes, blades and other components that are required to be cooled by a source of cooling air.

While the previous embodiments refer to internal cooling channels 82 having any one of the aforementioned cooling features 90. An alternative embodiment contemplates these cooling features 90 or any combination thereof being located on an exterior surface of a component of a gas turbine engine that requires cooling. For example, these features could be applied on an exterior face of a part, which in one embodiment may not be cored with internal cavities. Thus, and in one non-limiting embodiment, the cooling features 90 are only located on an exterior surface of a component. For example and referring to the aforementioned FIGS. the surface 77 could be an exterior surface of a component. In this embodiment, opening 108 would be the inlet opening for the cooling air and the opening 106 would be the outlet opening. Alternatively, the cooling features 90 may be located on both an external and internal surface of the component. Still further and in yet another alternative, they may be only located in an internal cooling channel(s) as described above. In one embodiment and if the cooling features 90 are located with the gas path or are located on a gas path surface, the cooling feature may have coating applied thereto in order protect the materials of the cooling feature from the high temperature gas flowing by (e.g., locations downstream of the combustor section 26 of the engine 20).

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A component for a gas turbine engine, comprising:

at least one internal cavity extending through the component, the internal cavity having at least one inlet opening and at least one outlet opening each being in fluid communication with the at least one internal cavity; and a plurality of cooling features extending from a surface of the at least one internal cavity, the plurality of cooling features extend away from the surface of the at least one internal cavity, each of the plurality of cooling features having a curved exterior surface and a passage extending from the curved exterior surface to an exterior surface of the component, wherein the passage has a lobed internal surface or a rifled internal surface with a plurality of lands and grooves;

wherein the passage has a passage inlet disposed at the exterior surface and a passage outlet, the passage inlet disposed downstream of the passage outlet relative to a direction of airflow through the internal cavity.

2. The component as in claim 1, wherein the passage follows a curvature of the curved exterior surface.

3. The component as in claim 1, wherein the lobed internal surface of the passage rotates either clockwise or counter with respect to a center axis of the passage.

4. The component as in claim 1, wherein the rifled internal surface of the passage rotates either clockwise or counter with respect to a center axis of the passage.

5. The component as in claim 1, wherein each of the plurality of cooling features has a symmetrical configuration.

6. The component as in claim 1, wherein each of the plurality of cooling features has an asymmetrical configuration.

7. The component as in claim 1, wherein the plurality of cooling features have symmetrical configurations and asymmetrical configurations.

8. A component for a gas turbine engine, comprising:

at least one internal cavity extending through the component, the internal cavity having at least one inlet opening and at least one outlet opening each being in fluid communication with the at least one internal cavity; and a plurality of cooling features extending from a surface of the at least one internal cavity, the plurality of cooling features extend away from the surface of the at least one internal cavity, each of the plurality of cooling features having a curved exterior surface and a passage extending from the curved exterior surface to an exterior surface of the component, wherein the component is a blade outer air seal and wherein the at least one internal cavity extends from a blade arrival edge to a blade departure edge of the blade outer air seal or the least one internal cavity extends axially across the blade outer air seal from a leading edge to a trailing edge or the at least one internal cavity is a plurality of internal cavities wherein at least one of the plurality of internal cavities extends from the blade arrival edge to the blade departure edge of the blade outer air seal and at least one of the plurality of internal cavity extends axially across the blade outer air seal from the leading edge to the trailing edge;

wherein the passage has a passage inlet disposed at the exterior surface and a passage outlet, the passage inlet disposed downstream of the passage outlet relative to a direction of airflow through the internal cavity.

9. The component according to claim 1, wherein the component is a blade outer air seal.

10. The component according to claim 1, wherein additional cooling features extend from an exterior surface of the component, each of the additional cooling features having a passage extending from the at least one internal cavity to an exterior surface of the additional cooling features.

11. The component according to claim 1, wherein each of the plurality of plurality of cooling features have a main body portion that extends from the surface of the at least one internal cavity and the main body portion has a larger base portion as compared to a top portion of the main body portion.

12. The component according to claim 11, wherein the top portion extends horizontally with respect to the surface of the at least one internal cavity, such that the top portion is angularly oriented with respect to the base portion.

13. The component according to claim 12, wherein the passage has an inlet opening located in the top portion.

14. A gas turbine engine, comprising;

at least one component configured to receive a cooling air flow;

at least one internal cavity extending through the component, the internal cavity having at least one inlet opening and at least one outlet opening each being in fluid communication with the at least one internal cavity; and a plurality of cooling features extending from a surface of the at least one internal cavity, the plurality of cooling features extend away from the surface of the at least one internal cavity, each of the plurality of cooling features having a curved exterior surface and a passage extending from the curved exterior surface to an exterior surface of the component, wherein the passage has a lobed internal surface or a rifled internal surface with a plurality of lands and grooves;

wherein the passage has a passage inlet disposed at the exterior surface and a passage outlet, the passage inlet disposed downstream of the passage outlet relative to a direction of airflow through the internal cavity.

15. The gas turbine engine as in claim 14, wherein the passage follows a curvature of the curved exterior surface.

16. The gas turbine engine as in claim 14, wherein the lobed internal surface of the passage rotates either clockwise or counter with respect to a center axis of the passage.

17. The component according to claim 14, wherein the component is one of a blade outer air seal, a turbine blade, and vane.

* * * * *